United States Patent
Wu et al.

(10) Patent No.: US 7,444,035 B2
(45) Date of Patent: Oct. 28, 2008

(54) BETTER PICTURE FOR INEXPENSIVE CAMERAS

(75) Inventors: Donghui Wu, Fremont, CA (US); Lingxiang Zhou, Fremont, CA (US)

(73) Assignee: ArcSoft, Inc., Fremont, CA (US)

(\*) Notice: Subject to any disclaimer, the term of this patent is extended or adjusted under 35 U.S.C. 154(b) by 0 days.

(21) Appl. No.: 11/836,089

(22) Filed: Aug. 8, 2007

(65) Prior Publication Data

US 2008/0031541 A1 Feb. 7, 2008

Related U.S. Application Data

(62) Division of application No. 10/641,679, filed on Aug. 15, 2003, now Pat. No. 7,280,706.

(51) Int. Cl.
*G06K 9/36* (2006.01)
(52) U.S. Cl. .................................... 382/274
(58) Field of Classification Search .......... 382/100, 382/254, 255, 274, 275
See application file for complete search history.

(56) References Cited

U.S. PATENT DOCUMENTS 3,716,660 A * 2/1973 Friedman .................. 178/7.7
6,754,400 B2 * 6/2004 Florin et al. ............... 382/285

OTHER PUBLICATIONS

Wei et al., "Implicit and Explicit Camera Calibration: Theory and Experiments," IEEE Trans. on Pattern Analysis and Machine Intelligence, vol. 16, No. 5, May 1994, pp. 469-480.*
Bax, "Real-time distortion correction using texture mapping," Proc. SPIE vol. 5029: Medical Imaging 2003: Visualization, Image-Guided Procedures, and Display, Feb. 2003, pp. 249-256.*

* cited by examiner

*Primary Examiner*—Andrew W Johns
(74) *Attorney, Agent, or Firm*—Patent Law Group LLP; David C. Hsia

(57) ABSTRACT

A method for correcting a radial distortion in an image includes receiving a radial distortion parameter from the user and calculating new intensity values of points in the image to correct a radial exposure distortion in the image.

7 Claims, 10 Drawing Sheets
(6 of 10 Drawing Sheet(s) Filed in Color)

BETTER PICTURE FOR INEXPENSIVE CAMERAS

CROSS REFERENCE TO RELATED APPLICATION

This application is a division of U.S. patent application Ser. No. 10/641,679, filed on Aug. 15, 2003, now U.S. Pat. No. 7,280,706, and incorporated herein by reference.

FIELD OF INVENTION

This invention relates to image enhancing software for low-cost cameras.

DESCRIPTION OF RELATED ART

The pictures captured by low-cost cameras, such as web cams and cameras embedded in cellular phones, are generally of poor quality. One of the reasons for the poor quality is the use of low-cost optical systems utilizing a fixed or almost fixed lens having a very short focal length. Another reasons for the poor picture quality is the use of low-cost CMOS (complementary metal oxide semiconductors) imaging sensors instead of CCD (charge-coupled device) sensors.

A low-cost camera may produce a picture with a nonlinear (barrel) distortion as shown in FIG. 1A. Thus, what is needed is a method to correct the nonlinear distortion in the pictures captured by low-cost cameras.

A low-cost camera may also produce a picture with an uneven radial exposure where the center portion of a picture is brighter than the surrounding portions as shown in FIG. 4A. Thus, what is needed is a method to correct the uneven radial exposure in the pictures captured by low-cost cameras.

A low-cost camera may further produce a picture with noise, and especially poor exposure, color cast, poor contrast, poor brightness, and poor focus as shown in FIGS. 6A, 7A, and 8A. Specifically, FIG. 6A shows one example of both poor exposure and color cast. FIG. 7A shows one example of poor contrast. FIG. 8A shows one example of poor brightness. Thus, what is needed is a method to reduce the noise, enhance the contrast, correct the color cast, and improve the focus of the pictures captured by low-cost cameras.

BRIEF DESCRIPTION OF THE DRAWINGS

The patent or application file contains at least one drawing executed in color. Copies of this patent or patent application publication with color drawings will be provided by the Office upon request and payment of the necessary fee.

SUMMARY

In one embodiment of the invention, a method for correcting a radial distortion in an image includes receiving a radial distortion parameter from the user and calculating new intensity values of points in the image to correct a radial exposure distortion in the image.

DETAILED DESCRIPTION

Optical Distortion Correction

In one embodiment of the invention, an optical nonlinear distortion model of a camera is assumed to comply with the following equations:

$$x'=x\cdot[1+k(x^2+y^2)]; \text{ and} \quad (1.1)$$

$$y'=y\cdot[1+k(x^2+y^2)]. \quad (1.2)$$

In Equations 1.1 and 1.2, (x,y) are the coordinates of a point (e.g., a pixel) with the nonlinear distortion (i.e., before correction), (x',y') are the coordinates of the point without the nonlinear distortion (i.e., after correction), and k is a global distortion parameter for the entire image. In this model, the origin of the coordinates is at the center of the image. Global distortion parameter k may change when the camera focus changes.

In the above optical model, a straight line equation in polar coordinates without nonlinear distortion is as follows:

$$\rho'\cos(\theta' - \alpha) = R. \quad (2.1)$$

$(\rho',\theta')$ are the polar coordinates of any point (e.g., pixel) on a straight line without nonlinear distortion (i.e., after correction), and $(\alpha,R)$ are the parameters of the straight line. With the nonlinear distortion, the polar coordinates of any point $(\rho',\theta')$ are calculated as follows:

$$\rho'=\rho(1+k\rho^2); \text{ and} \quad (2.2)$$

$$\theta'=\theta. \quad (2.3)$$

In Equations 2.2 and 2.3, $(\rho,\theta)$ are the polar coordinates of a point with the nonlinear distortion (i.e., before correction), $(\rho',\theta')$ are the polar coordinates of the point on a straight line without nonlinear distortion (i.e., after correction), and k is the global distortion parameter. Thus, the straight line equation in polar coordinates with the nonlinear distortion becomes:

$$\rho(1 + k\rho^2)\cos(\theta - \alpha) = R. \qquad (2.4)$$

Equation 2.4 has three variables of parameters ($\alpha$,R) and global distortion parameter k, which can be solved with the polar coordinates of three points known to lie in a straight line before the nonlinear distortion.

Figure 2A:
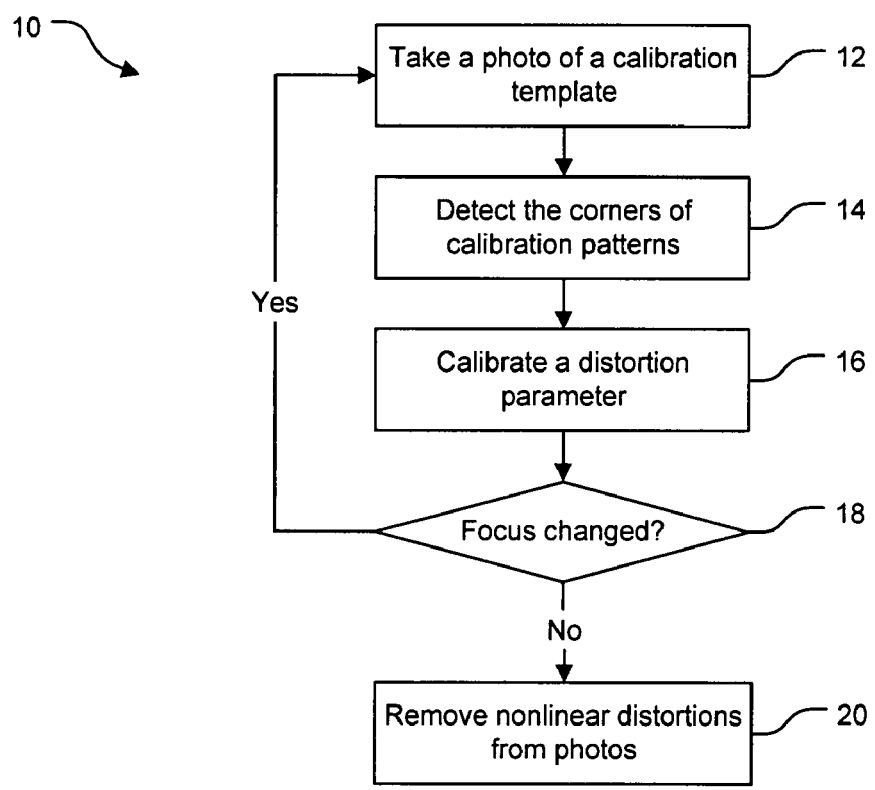
FIG. 2A is a flowchart of a method for correcting the nonlinear distortion in one embodiment of the invention.

FIG. 2A illustrates a method 10 for software to correct the nonlinear distortion in an image in on embodiment of the invention. Method 10 uses a calibration template to automatically detect and correct the nonlinear distortion. Method 10 is well suited for cameras with a fixed focus otherwise the software may need to be recalibrated each time the focus is changed. The software implementing method 10 can be located on the camera to process the image in real time or on a computer to process the image offline.

Figure 2B:
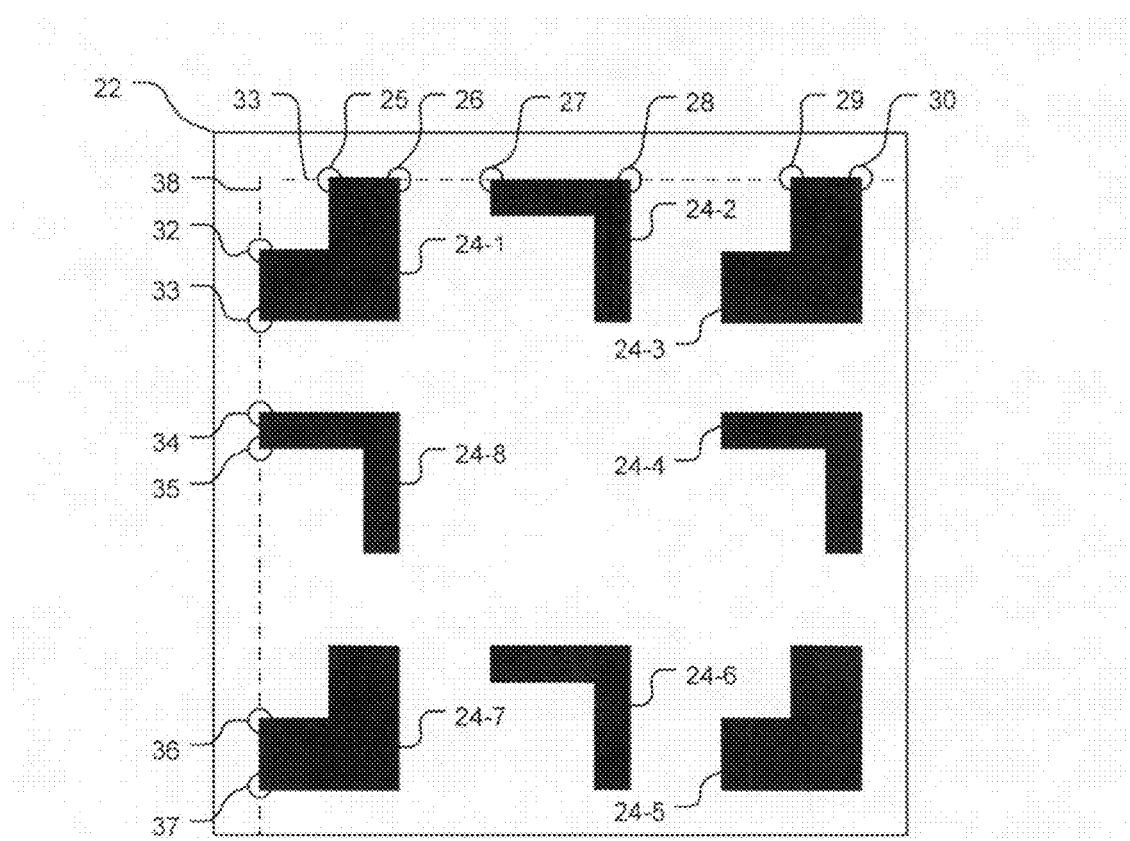
FIG. 2B is a calibration template used by the method of FIG. 2A in one embodiment of the invention.
Figure 2C:
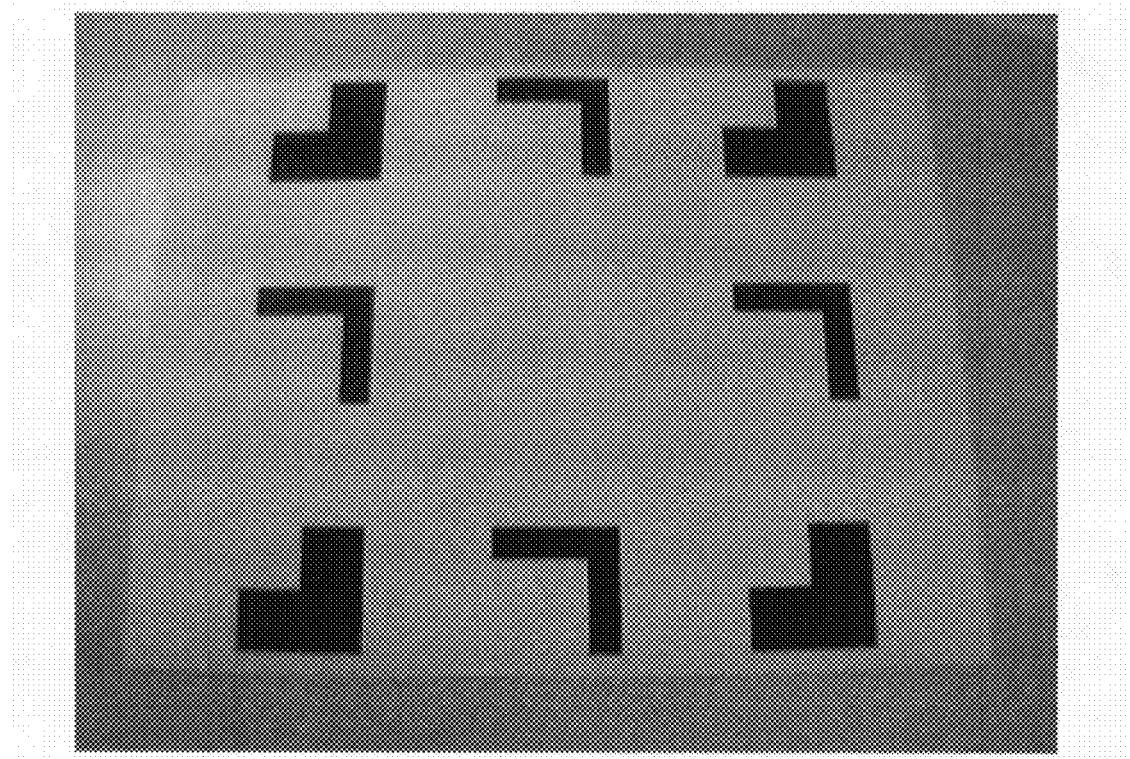
FIG. 2C is an image of the calibration template with non-linear distortion in one embodiment of the invention.

In step 12, a camera captures an image of a calibration template 22. FIG. 2B shows a calibration template 22. FIG. 2C shows calibration template 22 with nonlinear distortion as captured by the camera. Calibration template 22 includes L-shaped calibration patterns 24-1, 24-2, 24-2, 24-3, 24-4, 24-5, 24-6, 24-7, and 24-8 (collectively "calibration patterns 24"). Referring to FIG. 2B, calibration patterns 24 in the same column have their outer corners aligned vertically while calibration patterns 24 in the same row have their outer corners aligned horizontally.

In step 14, the software detects at least (1) a first set of three or more corners known to be on a first straight line, and (2) a second set of three or more corners known to be on a second straight line. For example, the software detects corners 25 and 26 of pattern 24-1, corners 27 and 28 of pattern 24-2, corners 29 and 30 of calibration pattern 24-3 known to lie on a straight line 33 if the camera does not have nonlinear distortion. Similarly, the software detects corners 32 and 33 of pattern 24-1, corners 34 and 35 of pattern 24-8, and corners 36 and 37 of pattern 24-7 known to lie on a straight line 38 if the camera does not have nonlinear distortion.

In step 16, the software determines distortion parameter k of equations 2.4 from the coordinates of the detected corners. Specifically, the software first determines the polar coordinates of corners 25 to 30 and 32 to 37. The software then solves parameters ($\alpha$,R) and distortion parameter k in equation 2.4 for each set of the corners known to be on the same straight line without the nonlinear distortion. For example, the software first determines parameters ($\alpha_1$, $R_1$) and $k_1$ from corners 25 to 30 known to be on straight line 31 using the following formula:

$$\rho(1 + k_1\rho^2)\cos(\theta - \alpha_1) = R_1. \qquad (2.5)$$

In Equation 2.5, ($\rho$,$\theta$) are polar coordinates of a point on line 31 with the nonlinear distortion, $k_1$ is the local distortion parameter for line 31, and ($\alpha_1$, $R_1$) are parameters of the line 31.

The software then determines parameters ($\alpha_2$, $R_2$) and $k_2$ with corners 32 to 37 known to be on straight line 38 with the following formula:

$$\rho(1 + k_2\rho^2)\cos(\theta - \alpha_2) = R_2. \qquad (2.6)$$

In Equation 2.6, ($\rho$,$\theta$) are polar coordinates of a point on line 38 with the nonlinear distortion, $k_2$ is the local distortion parameter for line 38, and ($\alpha_2$, $R_2$) are parameters of line 38.

In each set there are three unknowns and therefore 3 points are necessary to solve for these unknowns. Thus, in each set only the 3 corners that are farthest from each other are selected.

The software then choose one of local distortion parameters $k_1$ and $k_2$ that best fits the equations of all points in the image as the global distortion parameter k. Specifically, the software uses $k_1$ instead of $k_2$ to fit corners 32 to 37 on line 38. The software thus varies the value of ($\alpha_2$, $R_2$) to achieve the smallest error as follows:

$$e_1 = \sum_{i=1}^{3} |\rho_i(1 + k_1\rho_i^2)\cos(\theta_i - \alpha_2) - R_2|^2. \qquad (2.7)$$

In Equation 2.7, $e_1$ is the error achieved using $k_1$ instead of $k_2$ to fit corners 32 to 37 on line 38 and ($\rho_i$, $\theta_i$) are the polar coordinates of the three farthest corners on line 38. In one embodiment, the Levenberg-Marquardt method is used to minimize error $e_1$.

Similarly, the software uses $k_2$ instead of $k_1$ to fit corners 25 to 30 on line 31. Again, the software varies the value of ($\alpha_1$,$R_1$) to achieve the smallest error as follows:

$$e_2 = \sum_{i=1}^{3} |\rho_i(1 + k_2\rho_i^2)\cos(\theta_i - \alpha_1) - R_1|^2. \qquad (2.8)$$

In Equation 2.8, $e_2$ is the error achieved using $k_2$ instead of $k_1$ to fit corners 25 to 30 on line 31 and ($\rho_i$,$\theta_i$) are the polar coordinates of the three farthest corners on line 31. In one embodiment, the Levenberg-Marquardt method is used to minimize error $e_2$.

If $e_1$ is less than $e_2$, then the software selects $k_1$ as global distortion parameter k. Conversely, if $e_2$ is less than $e_1$, then the software selects $k_2$ as global distortion parameter k.

In step 18, the software determines if the focus of the camera has changed. If so, then step 18 is followed by step 12 and global distortion parameter k for the camera is recalibrated. Otherwise step 18 is followed by step 20.

Figure 1A:
FIG. 1A is an image with nonlinear distortion in one embodiment of the invention.
Figure 1B:
FIG. 1B is the image of FIG. 1A after the nonlinear distortion has been corrected in one embodiment of the invention.

In step 20, the software corrects nonlinear distortions from images captured with the camera. Specifically, the software uses global distortion parameter k and equations 1.1 and 1.2 to calculate the new coordinates of each point in the images. FIG. 1B shows one exemplary result.

Figure 3:
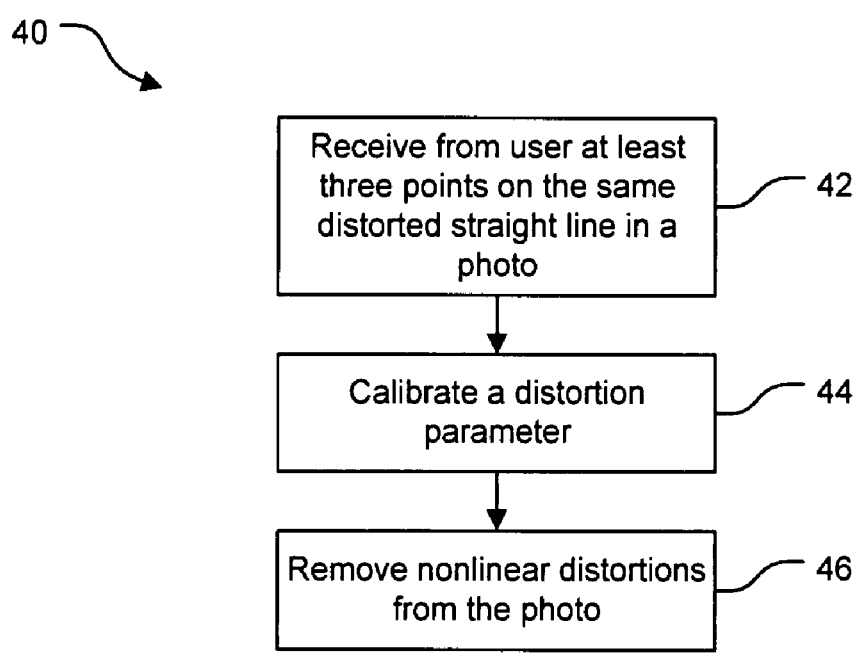
FIG. 3 is a flowchart of another method for correcting the nonlinear distortion in one embodiment of the invention.

FIG. 3 illustrates a method 40 for software to correct the nonlinear distortion in an image in on embodiment of the invention. Method 40 uses user inputs to correct the nonlinear distortion. Compared to method 10, method 40 is well suited for cameras with auto focus.

In step 42, the software receives from a user the identity of three points (e.g., pixels) in the image that are known to be on the same straight line.

In step 44, the software determines distortion parameter k using equations 2.4 from the coordinates of the three points as described above in step 16.

In step 46, the software corrects the nonlinear distortion from the image as described above in step 20.

Radial Exposure Correction

In one embodiment of the invention, a radial exposure model of a camera is assumed to comply with the following equations:

$$I'(x, y) = I(x, y)^{1+k(x^2+y^2)}. \tag{3.1}$$

In Equation 3.1, I'(x, y) is the intensity value of a point (x,y) in the image with radial exposure, I(x,y) is the intensity value of the point (x,y) in an ideal image without radial exposure, (x,y) are the coordinates of any point (e.g., pixel) in the image, and k is a distortion parameter. In this model, the origin of the coordinates is at the center of an image.

Figure 5:
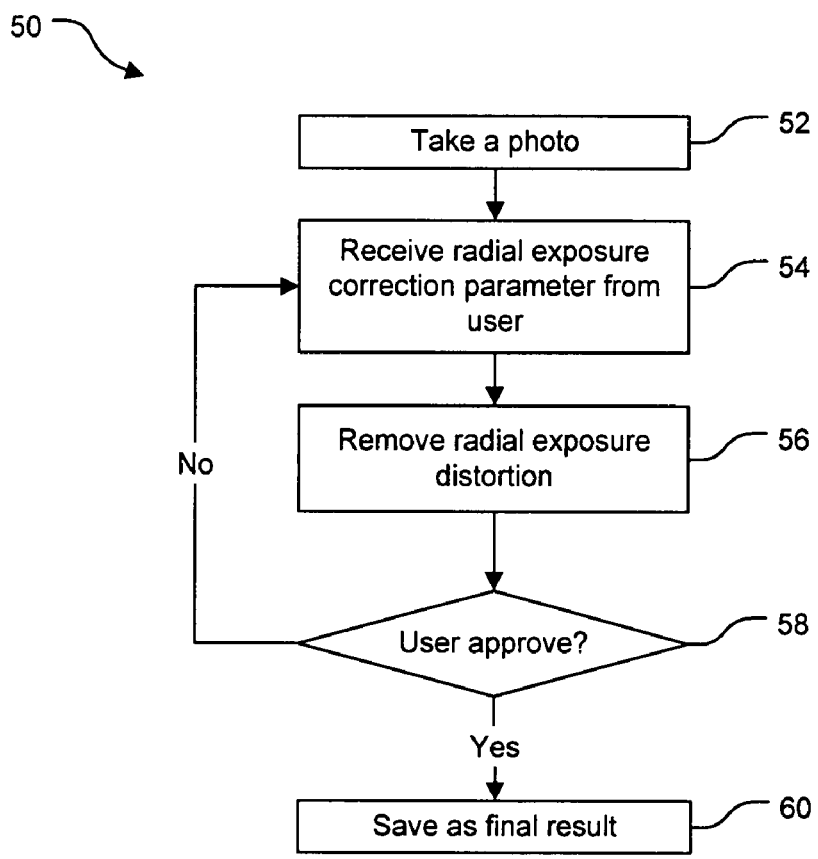
FIG. 5 is a flowchart of a method for correcting radial exposure in one embodiment of the invention.

FIG. 5 illustrates a method 50 for software to correct radial exposure in one embodiment of the invention.

In step 52, a camera captures an image.

In step 54, the software receives a value for radial distortion parameter k from a user.

In step 56, the software corrects the radial exposure using equation 3.1 with radial distortion parameter k and displays the corrected image to the user.

In step 58, the software determines if the user approves the corrected image. If so, step 58 is followed by step 60. Otherwise step 58 is followed by step 54 and the steps described above are repeated until.

Figure 4A:
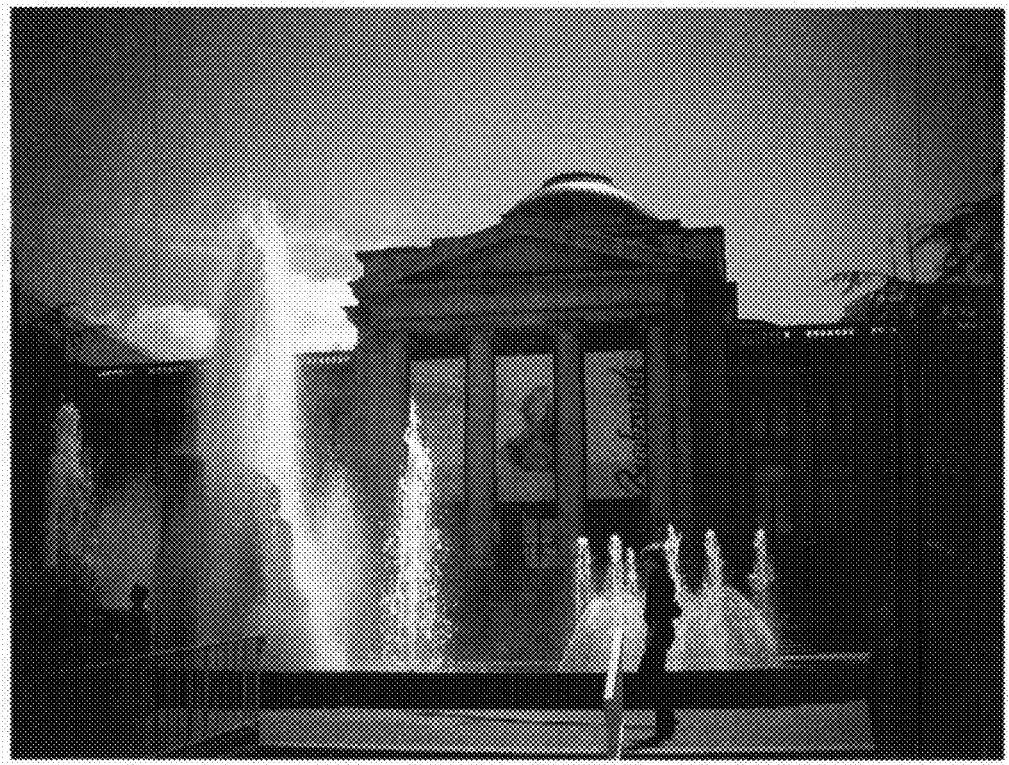
FIG. 4A is an image with radial exposure in one embodiment of the invention.
Figure 4B:
FIG. 4B is the image of FIG. 4A after the radial exposure has been corrected in one embodiment of the invention.

In step 60, the software saves the corrected image as the result. FIG. 4B shows an exemplary result.

Auto Picture Enhancement

Figure 9:
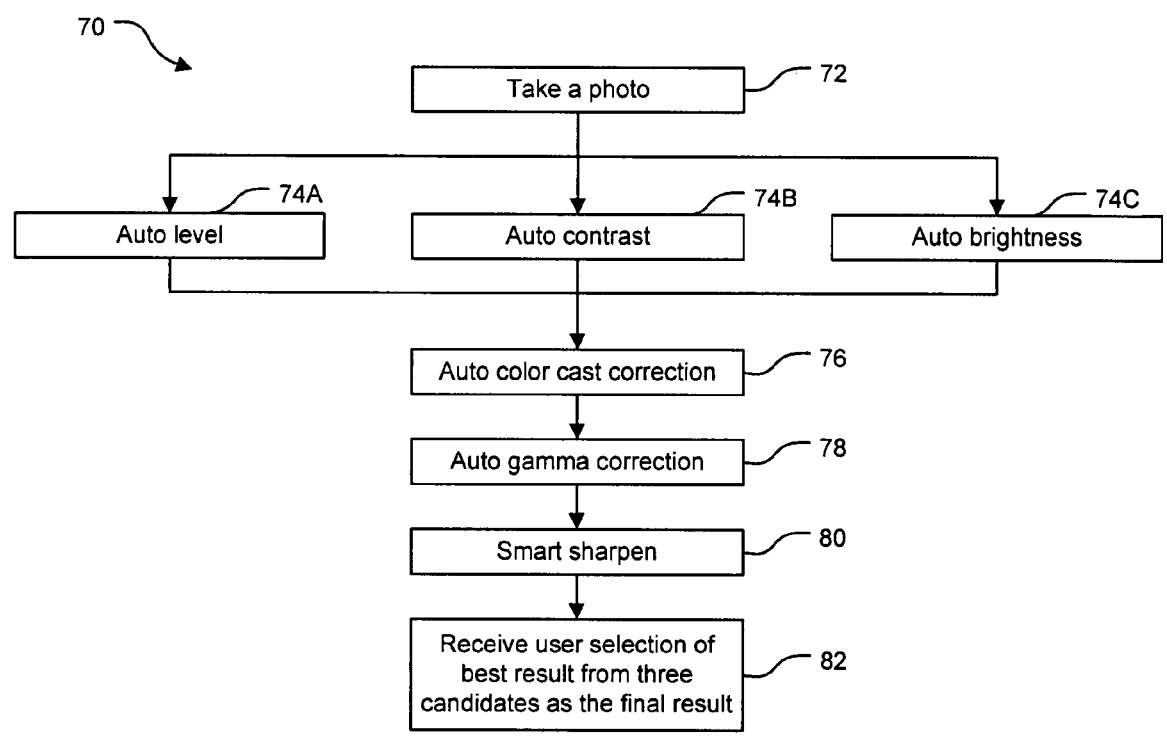
FIG. 9 is a flowchart of a method for enhancing an image in one embodiment of the invention.

FIG. 9 illustrates a method 70 for software to enhance an image in one embodiment of the invention. The software can compensate for noise, poor contrast, color cast, and poor focus.

In step 72, a camera captures an image.

The software then applies steps 74A, 74B, and 74C individually to transform the original image into three enhanced images.

In step 74A, the software performs an auto-level transformation to the original image. The auto-level transformation extends the RGB channels' range to [0,255]. Assume that current range of channel C is $[\min^{(C)}, \max^{(C)}]$, $C \in \{R,G,B\}$, the auto-level equation is:

$$g_{new}^{(C)} = \frac{255(g^{(C)} - \min^{(C)})}{\max^{(C)} - \min^{(C)}}. \tag{4}$$

In Equation 4, $g_{new}^{(C)}$ is the new value of channel C, $g^{(C)}$ is the original value of channel C, $\min^{(C)}$ is a minimum value of channel C, and $\max^{(C)}$ is a maximum value of the channel C. The transform coefficients in the RGB channels are different and may cause the color of the image to change after the transformation.

In step 74B, the software performs an auto-contrast transformation to the original image. Assume that the range of RGB channels is $[\min^{(C)}, \max^{(C)}]$, $C \in \{R,G,B\}$, min=MIN $(\min^{(R)}, \min^{(G)}, \min^{(B)})$, max=MAX$(\max^{(R)}, \max^{(G)}, \max^{(B)})$, the auto-contrast equation is defined as:

$$g_{new}^{(C)} = \frac{255(g^{(C)} - \min)}{\max - \min}. \tag{5}$$

In Equation 5, $g_{new}^{(C)}$ is the new value of channel C and $g^{(C)}$ is the original value of channel C.

In step 74C, the software performs an auto-brightness transformation to the original image. While auto-level and auto-contrast transformations are applied to the RGB channels, auto-brightness transformation is applied to the YCrCb channels. Auto-brightness will only change the Y channel while keeping the other two channels unchanged. Assuming that the range of the Y channel is [min Y, max Y], the auto-brightness equation is defined as $$Y_{new} = \frac{255(Y - \min Y)}{\max Y - \min Y}, \ Cr_{new} = Cr, \ Cb_{new} = Cb. \tag{6}$$

In Equation 6, $Y_{new}$ is the new value of channel Y, Y is the original value of channel Y, $Cr_{new}$ is the new value of channel Cr, Cr is the original value of channel Cr, $Cb_{new}$ is the new value of channel Cb, and Cb is the original value of channel Cb.

The software then applies steps 76, 78, and 80 individually to the three enhanced images from steps 74A, 74B, and 74C to generate three final candidates from which the user can select.

In step 76, the software performs an auto-color cast correction to each of the enhanced images. Assuming color cast is a translation in chromatic space, then the equations for channels YCrCb are defined as:

$$Cr_{new} = Cr_{old} + \Delta cr \tag{7.1}$$

$$Cb_{new} = Cb_{old} + \Delta cb \tag{7.2}$$

$$Y_{new} = Y_{old} \tag{7.3}$$

In Equations 7.1, 7.2, and 7.3, $Cr_{new}$ is the new value of channel Cr, $Cr_{old}$ is the original value of channel Cr, $\Delta cr$ is the color cast in channel Cr, $Cb_{new}$ is the new value of channel Cb, $Cb_{old}$ is the original value of channel Cb, $\Delta cb$ is the color cast in channel Cb, $Y_{new}$ is the new value of channel Y, and $Y_{old}$ is the original value of channel Y.

If color cast ($\Delta cr, \Delta cb$) is known, then the color cast can be removed from the image. To determine the color cast, the software first creates a 2D histogram Hist[Cr,Cb] and then determines the nearest peak from the origin (0,0). Hist[Cr,Cb] is defined as the count of points (e.g., pixels) with the chromatic value (Cr,Cb). A peak is located at a particular (cr,cb) if (1) Hist(cr,cb)>Hist[cr−1,cb], (2) Hist(cr,cb)>Hist[cr+1,cb], (3) Hist(cr,cb)>Hist[cr,cb−1], and (4) Hist(cr,cb)>Hist[cr,cb+1]. After determining the nearest peak from the origin, the software moves this peak to the origin. To do so, the software sets ($\Delta cr, \Delta cb$)=(−cr,−cb) that is the nearest peak.

In step 78, the software performs an auto-gamma correction to each of the enhanced images. Gamma correction equation is defined as:

$$Y_{new} = 255\left(\frac{Y_{old}}{255}\right)^{\alpha}. \tag{8}$$

In Equation 8, $Y_{new}$ is the new value of channel Y, $Y_{old}$ is the original value of channel Y, and $\alpha$ is the value that maximizes the entropy of image after correction. $\alpha$ can be estimated by maximizing Equation 9 below.

$$\sum_{1\leq x\leq 256} h(x)\alpha\left(\frac{x}{256}\right)^{\alpha-1}. \tag{9}$$

In Equation 9, h(x) is the histogram of Y channel before correction and x is the gray level of Y channel. Equation 9 assumes that the gray level of Y channel is from 1 to 256.

In step 80, the software performs a sharpness correction to each of the enhanced images. The sharpness correction uses a Laplacian filter as a basic operator but the filter is only applied to strong edges only instead of the entire image. The sharpness filter is defined as:

$$I_{new}(x,y) = \begin{cases} I_{old}(x,y), & \text{if } |\nabla I(x,y)| \leq T \\ I_{old}(x,y) + \lambda|\nabla^2 I(x,y)|, & \text{if } |\nabla I(x,y)| > T \end{cases} \tag{10.1}$$

where:

$$|\nabla I(x,y)| = \sqrt{I_x^2(x,y) + I_y^2(x,y)}, \tag{10.2}$$

$$I_x(x,y) = I(x+1,y) - I(x,y), \tag{10.3}$$

$$I_y(x,y) = I(x,y+1) - I(x,y), \text{ and} \tag{10.4}$$

$$|\nabla^2 I(x,y)| = I(x,y) - \frac{1}{8}\sum_{i=-1}^{1}\sum_{j=-1}^{1} I(x+i, y+j). \tag{10.5}$$

In Equations 10.1, 10.2, 10.3, 10.4, and 10.5, T is a threshold value that determines if there is a strong edge, $\lambda$ is a sharpness parameter, I( ) is intensity value at a point, $I_{new}(x,y)$ is the new intensity value at point (x,y), and $I_{old}(x,y)$ is the old intensity value at the point (x,y). In one embodiment, sharpness parameter $\lambda = 0.1$.

Figure 6A:
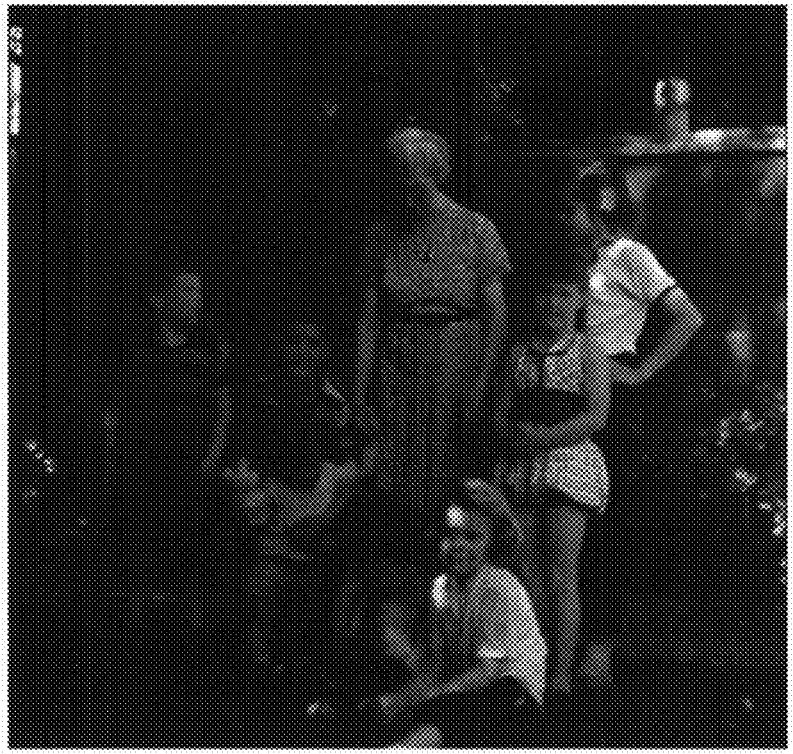
FIG. 6A is an image that has poor exposure and color cast in one embodiment of the invention.
Figure 6B:
FIG. 6B is the image of the FIG. 6A after the image has been enhanced in one embodiment of the invention.
Figure 7A:
FIG. 7A is an image that has poor contrast in one embodiment of the invention.
Figure 7B:
FIG. 7B is the image of the FIG. 7A after the image has been enhanced in one embodiment of the invention.
Figure 8A:
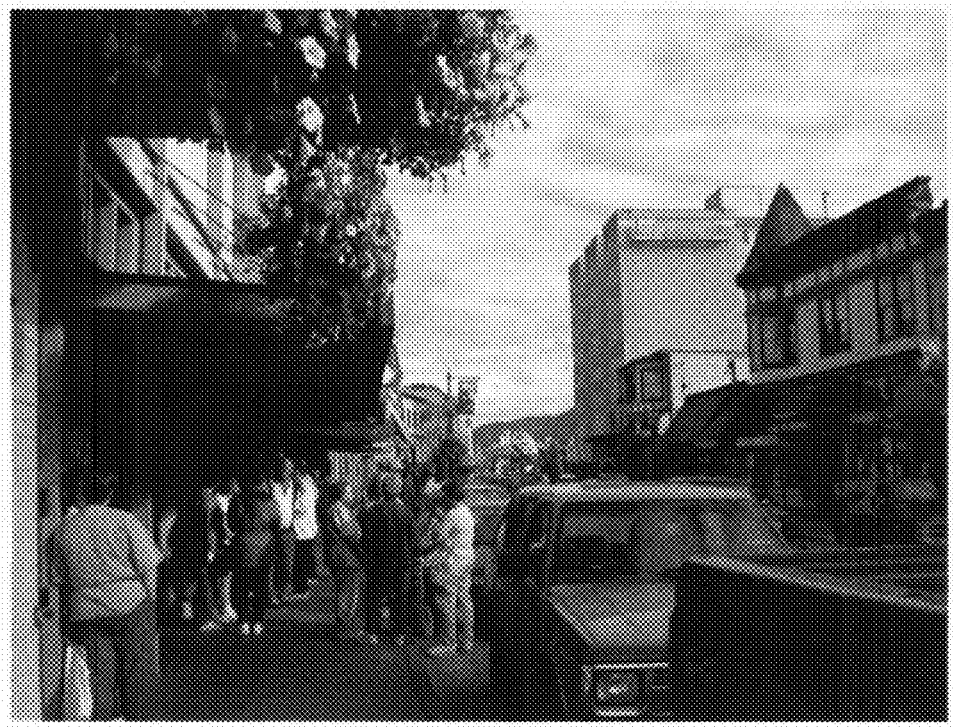
FIG. 8A is an image that has poor brightness in one embodiment of the invention.
Figure 8B:
FIG. 8B is the image of the FIG. 8A after the image has been enhanced in one embodiment of the invention.

In step 82, the software presents the three results to the user and prompts the user to select one of the three as the final result. FIGS. 6B, 7B, and 8B illustrate exemplary results that can be selected by the user. Specifically, FIG. 6B illustrates the result of the image in FIG. 6A that has undergone auto-contrast, auto-color cast, auto-gamma correction, and smart-sharpen modifications. FIG. 7B illustrates the result of the image in FIG. 7A that has undergone auto-level, auto-color cast, auto-gamma correction, and smart-sharpen modifications. FIG. 8B illustrates the result of the image in FIG. 8A that has undergone auto-brightness, auto-color cast, auto-gamma correction, and smart-sharpen modifications.

Various other adaptations and combinations of features of the embodiments disclosed are within the scope of the invention. For example, more than two local distortion parameters can be determined from more than two lines and the global distortion parameter can be selected more these more than two local distortion parameters. Numerous embodiments are encompassed by the following claims.

What is claimed is:

1. A method for correcting a radial exposure distortion in an image, comprising:
   calculating new intensity values of points in the image with the following equation:

$$I'(x,y) = I(x,y)^{1+k(x^2+y^2)},$$

where I'(x,y) is an intensity value of a point in the image with radial exposure, I(x,y) is an intensity value of the point without radial exposure, (x,y) are the coordinates of the point, and k is a radial distortion parameter.

2. The method of claim 1, further comprising receiving the radial distortion parameter from a user.

3. The method of claim 1, further comprising displaying the image with the new intensity values.

4. The method of claim 3, further comprising saving the image with the new intensity values.

5. The method of claim 4, wherein said saving occurs after a user approves the image with the new intensity values.

6. The method of claim 5, further comprising, prior to said calculating, capturing the image.

7. The method of claim 6, further comprising receiving the radial distortion parameter from the user.

* * * * *